Nov. 3, 1942.  A. T. GASKILL  2,300,917
METHOD OF MAKING BULBS
Filed Nov. 9, 1938
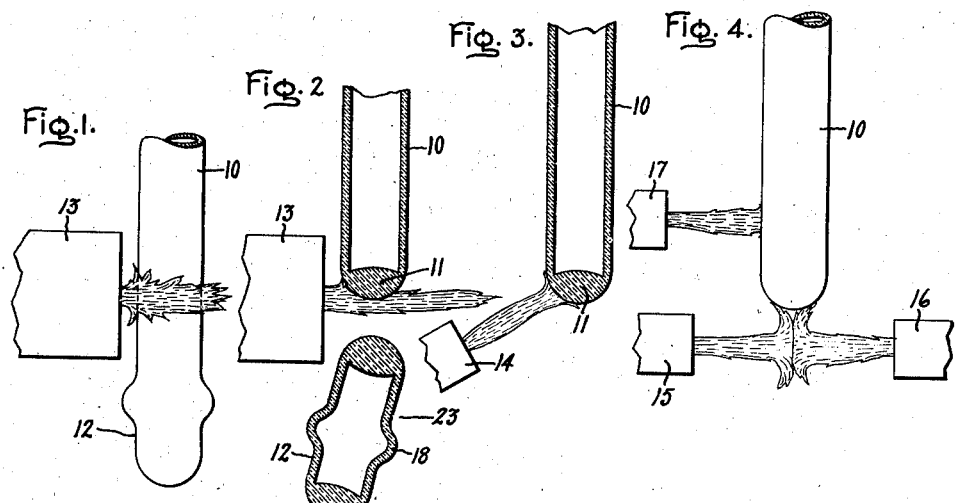
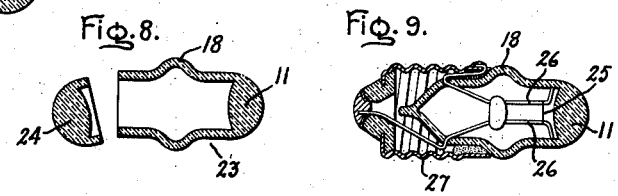
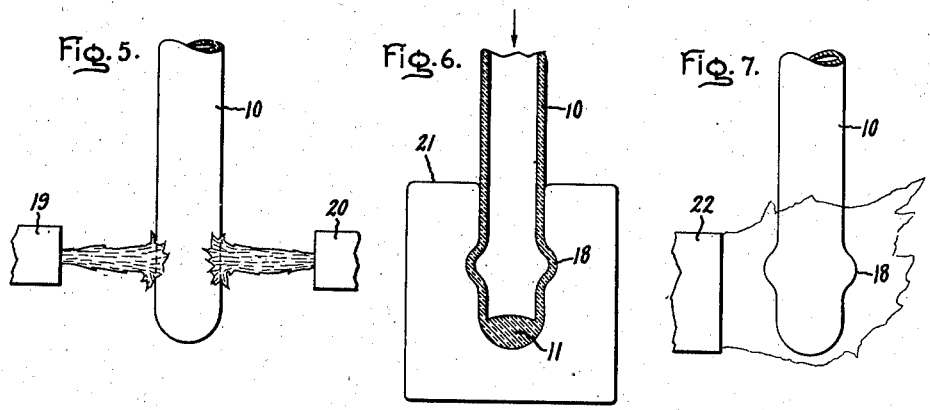
Inventor:
Alfred T. Gaskill,
by Harry E. Dunham
His Attorney.

Patented Nov. 3, 1942

2,300,917

UNITED STATES PATENT OFFICE 2,300,917

METHOD OF MAKING BULBS

Alfred T. Gaskill, Cleveland Heights, Ohio, assignor to General Electric Company, a corporation of New York Application November 9, 1938, Serial No. 239,621

3 Claims. (Cl. 49—84)

My invention relates to a method of making bulbs for electric lamps and more particularly to a method of making the lens-end type bulb used in miniature flashlight lamps.

Heretofore the only satisfactory method known of manufacturing the lens-end type bulb commercially was that disclosed in application Serial No. 726,892, filed May 22, 1934, by W. J. Geiger and the inventor herein, now Patent No. 2,159,736, dated May 23, 1939. According to that method the lens was formed by melting down an end portion of a cylindrical tube. However, that method involves somewhat considerable apparatus and operations in the full process of making the bulbs from the standard long lengths of tubing available and is therefore fairly costly in comparison with my present method.

According to my invention, a standard length of tubing sufficient for a considerable number of bulbs is mounted preferably in a vertical position and, while rotating about its vertical axis, is advanced through the various steps of the method to form bulbs successively from the lower end thereof. The steps in the manufacture of each lamp overlap, and the first operation in the formation thereof, which consists of the melting down of the glass tube to substantially the finished shape of the lens, also separates from the tube a portion already formed into a bulb in the previous cycle of operation. Following this operation, slight irregularities in the lens are preferably smoothed out and the lens is refined slightly so as to develop the desired shape. An adjacent part of the glass tube is then heated and, together with the lens portion, is enclosed in a mold which properly align the parts and allows the heated portion of the tube to expand into a bulbous portion when air is blown into the end thereof. The end of the glass tubing now forms a bulb which is separated from the remainder of the tubing in the process of forming a lens on the succeeding bulb. The operation of melting down the tubing into the lens also closes the end of the bulb already formed and the said closed end of the bulb is severed prior to the final assembly of said bulb with the other lamp parts in the usual manner. Bulbs manufactured by this method are very uniform and regularly shaped, particularly as to the shape of the lens, the overall length and the angularity of parts.

Other features and advantages of my invention will appear from the following detailed description and the accompanying drawing of my preferred method of operation wherein Figs. 1–8 show various steps in the process, and Fig. 9 is a sectional view of a finished lamp.

Although the bulb is formed from the glass tubing in one cycle of operation, the first operation, which consists in the melting down of the tube 10 to substantially the finished form of the lens 11 as shown in Figs. 1 and 2, also separates from said tube 10 a bulb 12 formed on the end thereof during the previous cycle of operation. The formation of the lens 11 and the separation of the tubing 10 is brought about by the flat wide flame from the burner 13 which is directed against the side of the tubing and which, in the course of melting down said tubing into the lens, separates the excess tubing comprising the bulb 12 therefrom so that it falls free. In this particular instance, the interior of the tubing 10 is left open to the atmosphere and the shaping of the lens 11 is dependent directly on the shape of the flame from the burner 13. Should a greater thickness of lens be desired, however, a greater portion of said tubing is melted down, preferably by a deeper flame or an angular flame made by tipping the burner 13 shown. A source of vacuum also can be connected to the tubing 10 to hold the lens in position if a deeper lens be desired or if a larger tubing is being melted down. A deeper lens 11 can also be made by upsetting the end of the tube 10 while it is in this softened condition.

After passing through the operation shown in Figs. 1 and 2, the lens 11 is again heated, this time by the flame from the burner 14 in the manner shown in Fig. 3 which takes out any irregularities and slightly reforms said lens. This operation is not always required as the tubing 10 may be so uniform that the lens 11 is formed satisfactorily by burner 13. In this instance, the lens is double convex in form.

The method of forming the lens 11 in accordance with my invention as described above eliminates cutting of the standard lengths of tubing into shorter lengths, eliminates all handling and glazing of the short lengths and also avoids all variations in the lenses caused heretofore by variations in cutting the standard lengths of tubing and chucking the shorter lengths preparatory to fusion of the lens portions.

Following the formation of the lens 11, the tubing 10 is placed over the juncture of the flames from the burners 15 and 16, as shown in Fig. 4, which keeps the lens 11 heated while the flame from the burner 17 heats an adjoining portion of the tube 10. This operation is the first in the forming of the bulbous portion 18 of the bulb which is formed after further heating of said tube portion by the flames from burners 19 and 20, as shown in Fig. 5, and the blowing of air into said tube 10 while the entire end thereof is enclosed in the mold 21, as shown in Fig. 6. The bulbous portion 18 is separated from the lens 11 by a substantially unaltered cylindrical portion of the tube 10 in order that no very round corners occur adjacent the lens since the light passing through such corners would be refracted and an undesirable beam would be projected by a lamp made from such a bulb. Because the lens portion 11 of the tubing 10 hangs downward, very little distortion takes place during the heating of the adjacent portion of the tubing 10. Such slight distortion, as well as any other, is eliminated by the blowing of the bulb in the fixed shape of the cavity of the mold 21 which provides a control over the complete bulb forming operation so desirable because of the accuracy of manufacture demanded by this type of lamp. After the mold 21 is opened, the end of the tube 10, now formed into the desired bulb shape, is heated by the soft deep narrow flame from the burner 22 which assists in relieving the bulb of strains.

The succeeding operations of my method consist in the separation of the bulb from the tubing 10 as previously described in connection with Figs. 1 and 2, which causes the closed blank 23, including said bulb 12, to be formed. The next step is the cracking off of the excess portion 24 of the blank 23, as shown in Fig. 8, and is the last in the manufacture of the bulb 12. The bulb 12 is subsequently made into a complete lamp containing a filament 25 and lead wires 26—26 as shown in Fig. 9, in accordance with standard practice, the bulbous portion 18 forming a seating shoulder against which the base 27 abuts.

In starting the formation of bubs from a new length of tubing 10, the tubing is positioned as shown in Fig. 1, preferably with its lower end located a short distance (say one inch) below the flame from burner 13. The end portion which is severed in the operation shown in Fig. 2 (corresponding to blank 23) is discarded.

It will be understood that various changes may be made in the process without departing from the spirit of my invention. For example, while I prefer to hold the tubing vertically and form the bulbs from the lower end thereof, the bulbs may be formed at the upper end of a vertically disposed tube, or at the end of a horizontally disposed tube, it being then necessary to pull away the endmost bulb during the severing and lens forming step shown in Fig. 2 in order to prevent sagging of the glass. The latter variations may be employed when working with tubing somewhat larger than the usual size of approximately ¼ inch diameter. The formation of the bulbous portion 18 on the lamp bulb may be omitted if desired.

What I claim as new and desire to secure by Letters Patent of the United States is:

1. The method of making lens-end bulbs for miniature electric lamps which comprises rotating a vertically disposed length of cylindrical glass tubing about its axis, directing a horizontally flattened flame against a portion of said tubing adjacent to but spaced from its lower end to sever the tubing and simultaneously form solid masses of fused glass closing both the upper end of the separated portion of tubing and the lower end of the remaining tubing, directing another flame upwardly at an angle against the said lower end of the remaining tubing to slightly reform the mass of glass thereat to constitute it a substantially finished definitely shaped lens, and then successively repeating similar applications of said horizontally flattened flame and said angularly directed flame to spaced portions of said remaining tubing, each of the separated lower end portions of tubing constituting a bulb blank having a definitely shaped solid glass lens portion at its lower end and a fused mass of glass closing its upper end, and finally severing the said upper end of said bulb blank to leave a bulb open at its upper end.

2. The method of making lens-end bulbs for miniature electric lamps which comprises successively directing a concentrated flame against spaced portions of a rotating cylindrical glass tube intermediate its ends to sever the tube, and maintaining the flame in position against the portion of the tube being severed so as to fuse only the extremities of the severed ends without distorting the cylindrical shape of the tube immediately adjacent said ends, and continuing such heating until the said extremity of the tube is fused into a solid mass of glass which has a substantially finished definite lens shape of no larger diameter than the tube itself.

3. The method of making lens-end bulbs as set forth in claim 2 wherein the said concentrated flame is flattened in a direction at right angles to the axis of the glass tube.

ALFRED T. GASKILL.